(12) United States Patent
Stallings

(10) Patent No.: US 8,339,376 B2
(45) Date of Patent: *Dec. 25, 2012

(54) ZOOMING TECHNIQUES FOR TOUCH SCREENS

(75) Inventor: Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,769

(22) Filed: Mar. 26, 2012

(65) Prior Publication Data

US 2012/0176335 A1    Jul. 12, 2012

Related U.S. Application Data

(63) Continuation of application No. 12/339,913, filed on Dec. 19, 2008, now Pat. No. 8,159,465.

(51) Int. Cl.
*G06F 3/041*    (2006.01)

(52) U.S. Cl. ........................................ 345/173; 715/864

(58) Field of Classification Search .................. None
See application file for complete search history.

(56) References Cited

U.S. PATENT DOCUMENTS

| | | | |
|---|---|---|---|
| 7,564,449 | B2 | 7/2009 | Layton et al. |
| 7,864,163 | B2 | 1/2011 | Ording et al. |
| 8,068,121 | B2 | 11/2011 | Williamson et al. |
| 2009/0265670 | A1 | 10/2009 | Kim et al. |
| 2009/0300554 | A1 | 12/2009 | Kallinen |
| 2010/0007613 | A1 | 1/2010 | Costa |

FOREIGN PATENT DOCUMENTS

JP        2004280745        10/2004

*Primary Examiner* — Jason Olson

(57) ABSTRACT

A device may include a touch-sensitive display, a memory to store a group of instructions, and a processor. The processor may execute the instructions in the memory to detect that a circular motion is being made on or near a surface of the touch-sensitive screen, detect a location on the touch-sensitive screen at which the circular motion is being made, and zoom in or zoom out on an item, being displayed on the touch-sensitive screen at the detected location, based on detecting that the circular motion is being made on or near the surface of the touch-sensitive screen.

20 Claims, 17 Drawing Sheets

| PROGRAM 510 | MIN 520 | MAX 530 | SPEED 540 | ZOOM IN DIRECTION 550 | LOCATION ZOOMING 560 |
|---|---|---|---|---|---|
| PHOTO EDITING APPLICATION | 10% | 1200% | SLOW | CLOCKWISE | ENABLED |
| WORD PROCESSING APPLICATION | 10% | 400% | MEDIUM | CLOCKWISE | DISABLED |
| BROWSER APPLICATION | 10% | 400% | FAST | COUNTER-CLOCKWISE | ENABLED |
| ⋮ | | | | | |
| APPLICATION IDENTIFIER | MIN VALUE | MAX VALUE | SPEED VALUE | DIRECTION INDICATION | ENABLED/ DISABLED INDICATION |

ZOOMING TECHNIQUES FOR TOUCH SCREENS

RELATED APPLICATION

This application is a continuation of U.S. patent application Ser. No. 12/339,913, filed Dec. 19, 2008, which is incorporated herein by reference.

BACKGROUND

Electronic devices continue to increase in complexity and functionality. This poses several challenges to designers of such devices. For example, it may be difficult to develop and provide an intuitive, functional, and convenient user interface for an electronic device having robust functionality, especially when the device is small in size.

Recently, touch-screen displays have become popular user interfaces for certain electronic devices. Touch-screens are especially conducive to small electronic devices at least because they allow for an expansive set of user inputs and can replace other limited input interfaces such as dedicated mechanical input buttons. However, there remains room to improve upon standard touch screen interfaces.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1A:
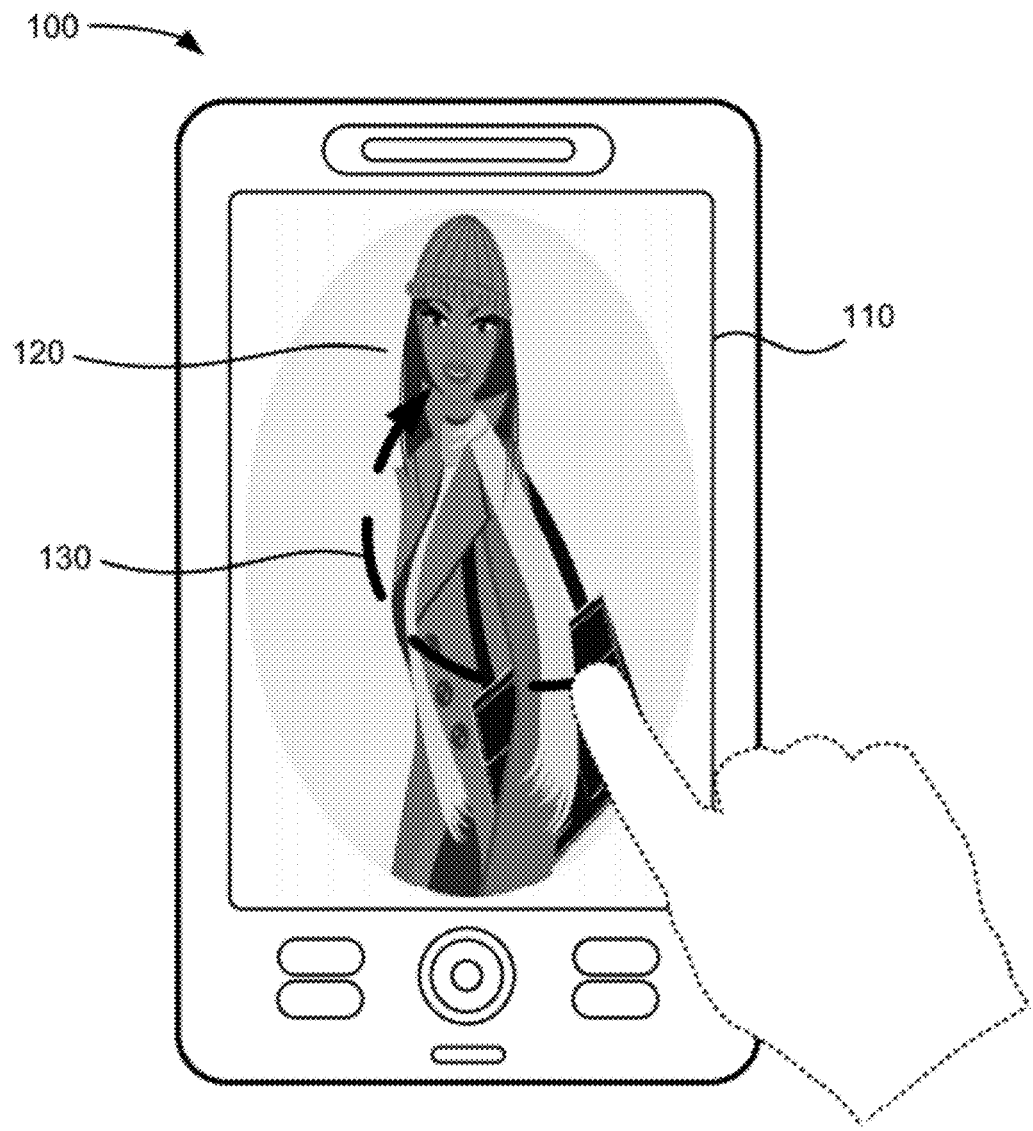
FIGS. 1A and 1B depict a diagram of an exemplary implementation of the concepts described herein.
Figure 1B:
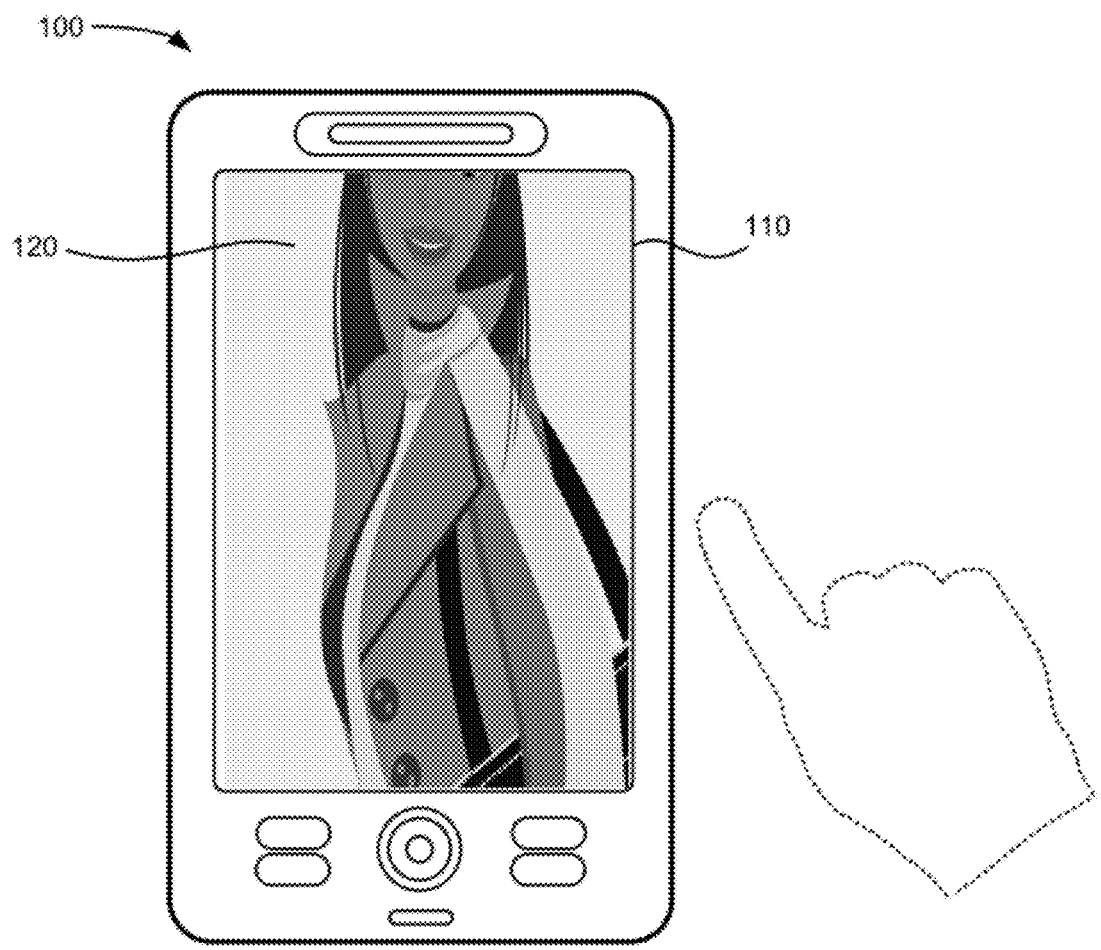

Systems and/or methods described herein may provide a user interface for a device. The device may include, for example, a cell phone, a personal digital assistant (PDA), a personal computer, a laptop computer, a remote control, a display device, etc. FIGS. 1A and 1B provide diagrams illustrating an exemplary implementation of a device 100. As illustrated, device 100 may include a touch-sensitive screen (also called a touch screen) 110. As is known in the art, a touch screen is a type of display that can detect the presence and location of touch within the display area.

As illustrated in FIG. 1A, assume that a picture 120 is being displayed via touch screen 110. According to implementations described herein, a user may zoom in on picture 120 or zoom out on picture 120 by making a circular motion on touch screen 110. For example, a clockwise motion on touch screen 110 may cause a zoom in operation (e.g., to enlarge a displayed portion of picture 120) to be performed on picture 120. Similarly, a counter-clockwise motion on touch screen 110 may cause a zoom out operation (e.g., to shrink a displayed portion of picture 120) to be performed on picture 120.

Assume, as illustrated in FIG. 1A, that the user desires to zoom in on picture 120. Thus, the user may, for example, make a clockwise motion 130 on touch screen 110 (e.g., with the user's finger or an object, such as a stylus) to cause the zoom in operation to be performed. In response, device 100 may cause an enlarged portion of picture 120 to be displayed to the user, as illustrated in FIG. 1B.

Figure 2:
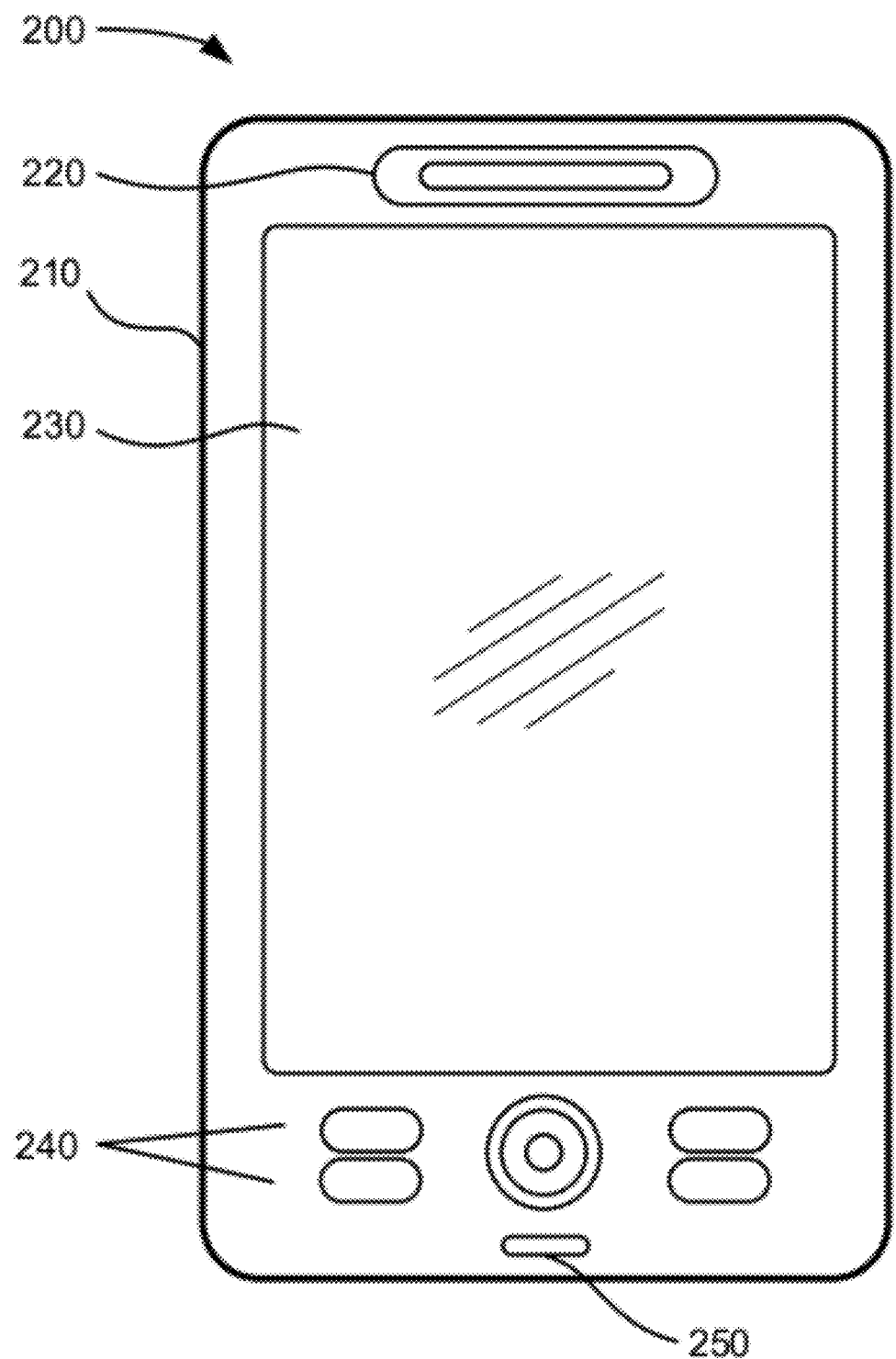
FIG. 2 depicts a diagram of an exemplary device in which systems and/or methods described herein may be implemented.

FIG. 2 is a diagram of an exemplary device 200 in which systems and/or methods described herein may be implemented. Device 200 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a portable gaming system, a display device, a global positioning system (GPS) device, a printer, a facsimile machine, a pager, a camera, a video camera (e.g., a camcorder), a telescope, a personal computer, a laptop computer, any other device capable of receiving user input to a display.

As illustrated in FIG. 2, device 200 may include a housing 210, a speaker 220, a display 230, control buttons 240, and/or a microphone 250. Housing 210 may protect the components of device 200 from outside elements. Housing 210 may include a structure configured to hold devices and components used in device 200, and may be formed from a variety of materials. For example, housing 210 may be formed from plastic, metal, or a composite, and may be configured to support speaker 220, display 230, control buttons 240 and/or microphone 250.

Speaker 220 may provide audible information to a user of device 200. Speaker 220 may be located in an upper portion of device 200, and may function as an ear piece when a user is engaged in a communication session using device 200. Speaker 220 may also function as an output device for music and/or audio information associated with games and/or video images played on device 200.

Display 230 may provide visual information to the user. For example, display 230 may display text, images, video, and/or graphics received from another device, and/or information regarding incoming or outgoing calls or text messages, emails, media, games, phone books, address books, the current time, etc. For example, display 230 may include a liquid crystal display (LCD), such as a thin film transistor (TFT) LCD, etc.

In one implementation, display 230 may include a touch screen display that may be configured to receive user input when a user touches (or comes in close proximity to) display 230. For example, the user may provide an input to display 230 directly, such as via the user's finger, or via other devices, such as a stylus. User inputs received via display 230 may be processed by components and/or devices of device 200. The touch-screen-enabled display 230 may permit the user to interact with device 200 in order to cause device 200 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 230 to be used as an input device. The touch-screen-enabled display 230 may also identify movement of a body part or a pointing device as it moves on or near the surface of the touch-screen-enabled display 230.

Control buttons 240 may permit the user to interact with device 200 to cause device 200 to perform one or more operations. For example, control buttons 240 may be used to cause device 200 to transmit information. Microphone 250 may receive audible information from the user. For example, microphone 250 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. For example, in some implementations device 200 may include a keypad, such as a standard telephone keypad, a QWERTY-like keypad (e.g., a traditional configuration of typewriter or computer keyboard keys), or another keypad layout. In still other implementations, a component of device 200 may perform one or more tasks described as being performed by another component of user device 200.

Figure 3:
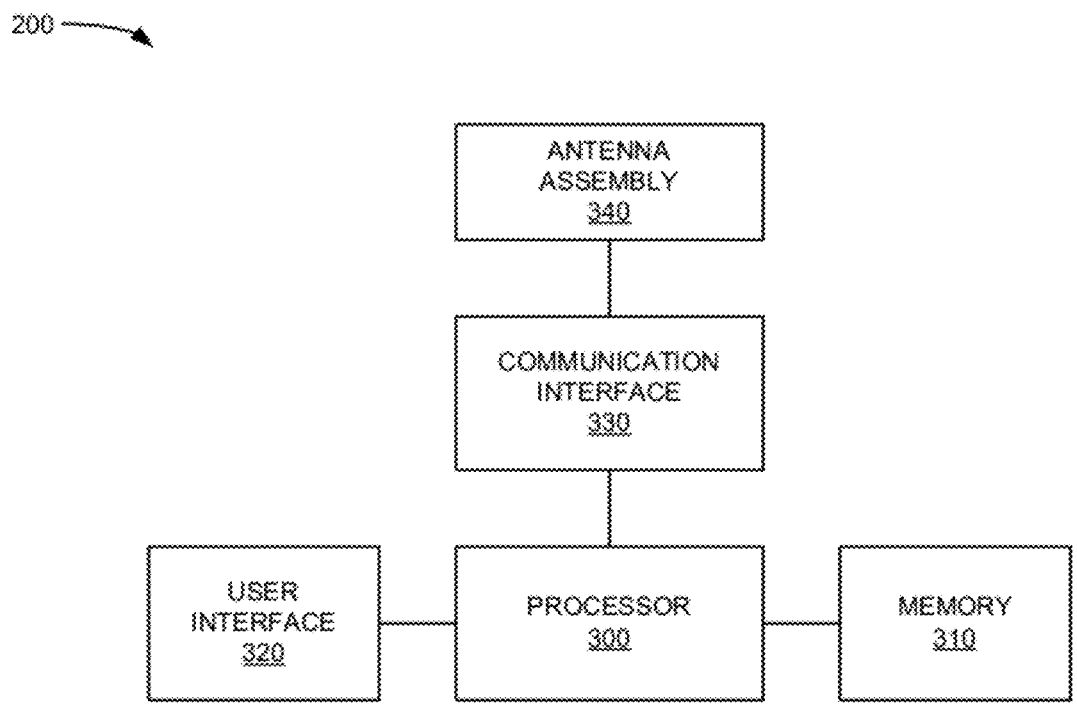
FIG. 3 depicts a diagram of exemplary components of the device illustrated in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store instructions for performing a zoom operation on one or more items displayed on display 230.

User interface 320 may include mechanisms for inputting information to device 200 and/or for outputting information from device 200. Examples of input and output mechanisms might include buttons (e.g., control buttons 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and to output visual information; a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
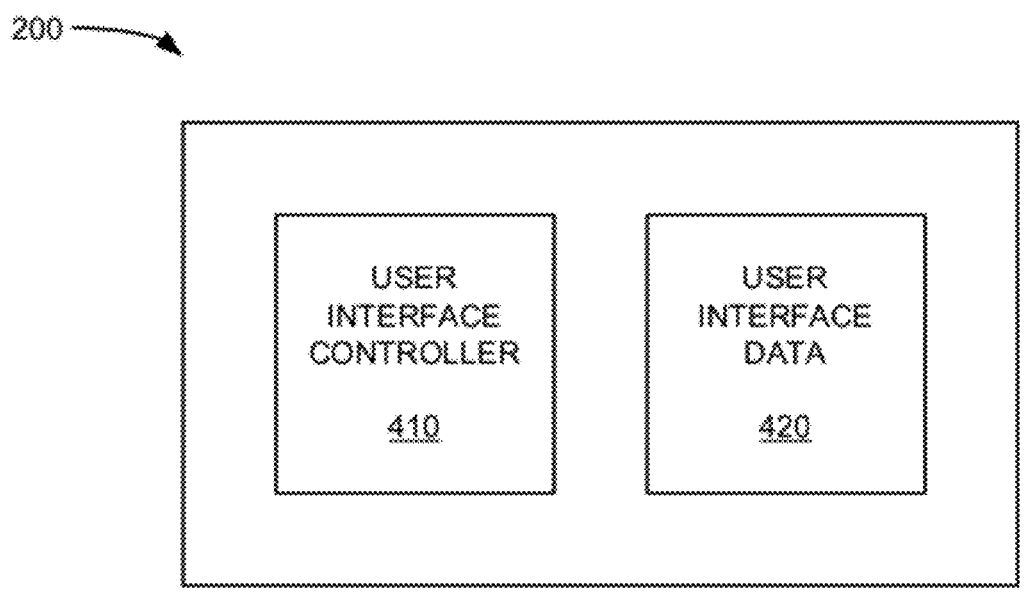
FIG. 4 depicts a diagram of exemplary functional components of the device illustrated in FIG. 2.

FIG. 4 provides a diagram of exemplary functional components of device 200. As shown in FIG. 4, device 200 may include a user interface controller 410 and a user interface data component 420. Device 200 may also include other peripheral applications (not shown) that provide communication to and other services for device 200. Peripheral applications may include, for example, a telephone application, a text-messaging application, an email application, an instant messaging (IM) application, a calendar application, a multimedia messaging service (MMS) application, a short message service (SMS) application, an image viewing application, a camera application, an organizer, a video player, an audio application, a global positioning satellite (GPS) application, etc.

User interface controller 410 may detect user inputs and provide special effects based on the user inputs. For example, user interface controller 410 may detect a circular motion on or near the surface of display 230 and cause a special effect (e.g., a zoom in or zoom out operation) to be performed in response to the detected circular motion. User interface controller 410 may also detect a location on display 230 at which the circular motion was performed and may cause a special effect (e.g., a zoom in or zoom out operation) to be performed on an item displayed at that portion of display 230. In causing the special effect to be performed, user interface controller 410 may cause the application with which the item is associated to perform the special effect (e.g., the zoom operation). While a zoom in or zoom out operation has been described and is described below as the special effect, other types of special effects may be performed in response to the circular motion. In one implementation, the user may specify the special effect to be performed in response to the detection of a circular motion input. User interface controller 410 may also allow a user to store parameters, delete parameters, and/or modify parameters from user interface data component 420.

Figure 5:
FIG. 5 illustrates an exemplary diagram of the contents of the user interface data component illustrated in FIG. 4.

User interface data component 420 may store parameters for use by user interface controller 410 in providing special effects. In one implementation, user interface data component 420 may be stored within memory 310. FIG. 5 illustrates an exemplary diagram of the contents of user interface data component 420 in an exemplary implementation. As illustrated, user interface data component 420 may include a table (or database). While one table is illustrated in FIG. 5, it will be appreciated that the table may consist of multiple tables stored locally at device 200, or stored at one or more different and possibly remote locations.

As illustrated, the table may include a group of entries in the following exemplary fields: a program field 510, a minimum size (MIN) field 520, a maximum size (MAX) field 530, a speed field 540, a zoom in direction field 550, and a location zooming field 560. The table may contain additional fields (not shown) that aid user interface controller 410 in providing special effects to a user of device 200.

Program field 510 may store information identifying a program (or application) associated with device 200. For example, program field 510 may store information identifying a photo editing application, a word processing application, a network browser application, a spreadsheet application, and/or other types of applications that may be associated with device 200. The applications may cause items to be displayed on display 230. An item may include any information that can be displayed on display 230, such as a word processing document, a spreadsheet document, a web page, a picture, etc.

Minimum size field 520 may store a value identifying the minimum size to which an item associated with the application identified in program field 510 and displayed on display 230 can be zoomed. In one embodiment, the value may be represented as a percentage, where the original size of the item is considered to be at 100%. As illustrated in FIG. 5, for example, an image displayed for the photo editing application can be shrunk down to 10% of its original size.

Maximum size field 530 may store a value identifying the maximum size to which an item associated with the application identified in program field 510 and displayed on display 230 can be zoomed. In one embodiment, the value may be represented as a percentage, where the original size of the data is considered to be at 100%. As illustrated in FIG. 5, for example, an image displayed for the photo editing application can be enlarged to 1200% of its original size.

Speed field 540 may store information identifying how quickly a zoom operation is performed in response to a circular motion. For example, a zoom operation may be set to increased/decreased a displayed item in 10% increments/decrements (which may be considered a slow speed zoom), 50% increments/decrements (which may be considered a medium speed zoom), or 100% increments/decrements (which may be considered a fast speed zoom). These increments are exemplary and other increments may be specified.

As an alternative, the speed at which a zoom operation is performed may be based on the size of the circular motion detected on display 230. For example, speed field 540 may specify that a slower zoom operation is to be performed when a smaller circular motion is detected on display 230 and a faster zoom operation is to be performed when a larger circular motion is detected on display 230.

Zoom in field 550 may store information identifying the type of circular motion that causes a zoom in operation to be performed. For example, a zoom in operation may be set to be performed in response to a clockwise circular motion or a counter-clockwise circular motion. The zoom out operation may be set by default to be performed in response to an opposite circular motion to the circular motion specified for the zoom in operation.

Location zooming field 560 may store information identifying whether zooming is to be performed at the location of a detected circular motion or at a predefined position (e.g., at the center of display 230). In one embodiment, location zooming field 560 may store an indication of whether location zooming has been enabled or disabled for the application identified in program field 510.

As an example, FIG. 5 indicates that the photo editing application is associated with the following parameters: items can be zoomed down to 10% or up to 1200% of their original size, detection of a circular motion on an item being displayed in connection with the photo editing application causes a slow zoom in or zoom out operation to be performed, a detected clockwise circular motion causes a zoom in operation to be performed, a detected counter-clockwise circular motion (by default) causes a zoom out operation to be performed, and location zooming has been enabled for the photo editing application. As another example, the network browser application is associated with the following parameters: items can be zoomed down to 10% or up to 400% of their original size, detection of a circular motion on an item being displayed in connection with the network browser application causes a fast zoom in or zoom out operation to be performed, a detected counter-clockwise circular motion causes a zoom in operation to be performed, a detected clockwise circular motion (by default) causes a zoom out operation to be performed, and location zooming has been disabled for the network browser application.

In one implementation, user interface data 420 may store default parameters settings, which may indicate, for example, that a clockwise circular motion on display 230 causes a zoom in operation to be performed on any item displayed on display 230 (e.g., regardless of the application currently being executed and displayed in display 230) and that a counter-clockwise circular motion on display 230 causes a zoom out operation to be performed on any item displayed on display 230 (e.g., regardless of the application currently being executed and displayed in display 230). Device 200 may permit the user to modify the default parameter settings, as illustrated by the exemplary parameters shown in FIG. 5.

Figure 6:
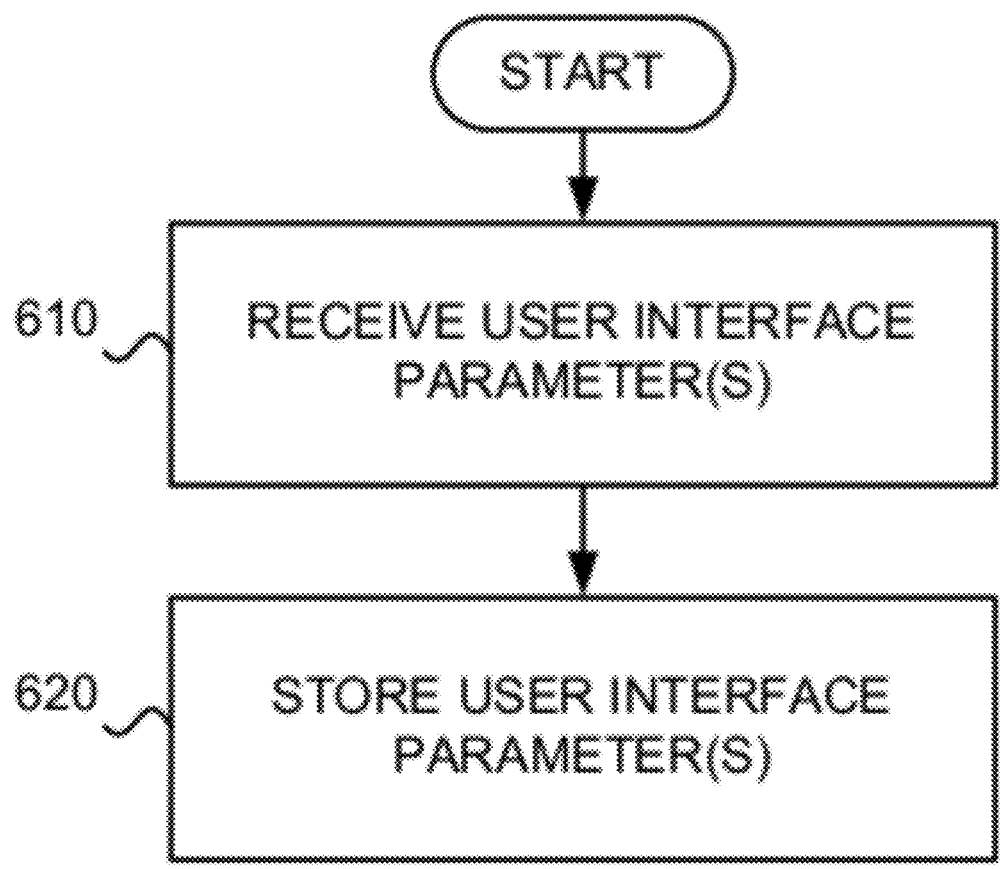
FIG. 6 depicts a flow chart of an exemplary process for configuring user interface parameters according to implementations described herein.

FIG. 6 depicts a flow chart of an exemplary process for configuring user interface parameters according to implementations described herein. In one implementation, the processing of FIG. 6 may be performed by device 200. In another implementation, some or all of the processing described below may be performed by one or more devices, alone or in combination with device 200.

Processing may begin with device 200 (e.g., user interface controller 410) receiving zoom in/zoom out parameters from a user (block 610). A user may initiate configuration of the zoom in/zoom out parameters in response to a command from the user or the initiation of a particular application (e.g., a touch screen configuration application). The zoom in/zoom out parameters may include, for example, some or all of the parameters identified in FIG. 5. As discussed above, configuration parameters may be provided on a per application basis. Alternatively, the configuration parameters may be set to be applicable to all applications or a group of applications. In either event, the user may provide parameters that affects how the zoom in and zoom out operations are to be performed and when they are to be performed. Although not discussed in connection with FIG. 5, the user may specify that the zoom in and zoom out operations are to only be performed when device 200 is in a particular orientation (e.g., only when device 200 is being held for landscape view and not when in portrait view) or may specify different sets of parameters based on the orientation of device 200.

Once the desired zoom in/zoom out parameters have been entered, device 200 (e.g., user interface controller 410) may store the zoom in/zoom out parameters (block 620). For example, user interface controller 410 may store the zoom in/zoom out parameters in user interface data component 420.

Figure 7:
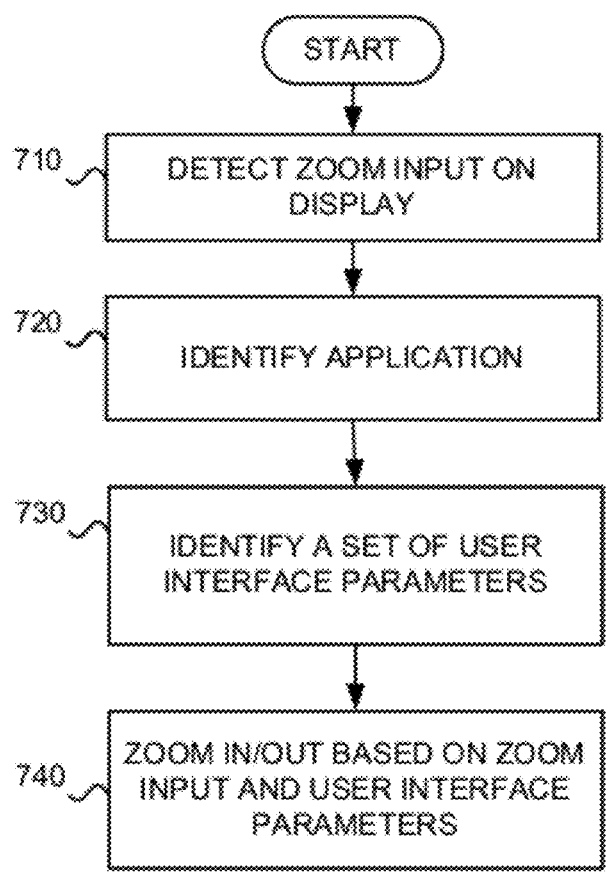
FIG. 7 depicts a flow chart of an exemplary process for zooming in or out on an item according to implementations described herein.

FIG. 7 depicts a flow chart of an exemplary process for zooming in or out on an item according to implementations described herein. In one implementation, the processing of FIG. 7 may be performed by device 200. In another implementation, some or all of the processing described below may be performed by one or more devices, alone or in conjunction with device 200.

Processing may begin with device 200 detecting a zoom input on display 230 (block 710). For example, user interface controller 410 may detect that the user is making a circular motion on display 230. In one implementation, display 230 may detect that the circular motion is being made and pass information relating to the circular motion to user interface controller 410. The information may include the direction of the circular motion (e.g., clockwise or counter-clockwise), the distance traversed on display 230 in making the circular motion, a location on display 230 at which the circular motion is being made, and/or other information.

User interface controller 410 and/or display 230 may detect the circular motion in response to the user making a circular motion on the surface of display 230 (e.g., with the user's finger or an apparatus, such as a stylus) or in response to the user making a circular motion above the surface of display 230 (e.g., with the user's finger or an apparatus, such as a stylus). Thus, the user may not need to actually touch the surface of display 230 for the circular motion to be detected.

Device 200 may identify an application in response to detecting the zoom input (block 720). For example, the user of device 200 may cause an application (e.g., a photo editing application) associated with device 200 to be executed by device 200. User interface controller 410 may identify the application in response to the detected zoom input. If more than one application is currently being executed by device 200, user interface controller 410 may identify an application based on a window associated with the application being active or based on an item associated with the application currently displayed by display 230.

Device 200 may identify a set of user interface parameters (block 730). For example, user interface controller 410 may use the identity of the application to retrieve parameters from user interface data component 420. As an example, assume that the application is a photo editing application. In this situation, user interface controller 420 may retrieve the parameters associated with the photo editing application in user interface data 420 (FIG. 5). Alternatively or additionally, user interface controller 410 may detect the orientation of device 200 (e.g., portrait or landscape) and use the orientation to retrieve parameters from user interface data component 420.

Device 200 may zoom in or zoom out on an item displayed on display 230 based on the detected zoom input and the identified set of user interface parameters (block 740). Assume, as set forth above, that the application is a photo editing application, that a picture is currently being displayed on display 230, and that the user has specified the parameters illustrated in FIG. 5. In addition, assume that the user is making a clockwise circular motion, as the zoom input, on the surface of display 230. In response, user interface controller 410 may begin zooming in on the picture at a slow speed as the user is making the clockwise circular motion. While the zooming in is described as being performed by user interface controller, the zooming in may actually involve user interface controller 410 causing the photo editing application to zoom in on the picture at a slow speed. Moreover, since location zooming is enabled for the photo editing application (as indicated in FIG. 5), user interface controller 410 (alone or in combination with the photo editing application) may zoom in on the picture at the location where the user is making the clockwise circular motion. User interface controller 410 (alone or in combination with the photo editing application) may continue zooming in on the picture until either the user stops making the clockwise circular motion or the maximum zoom in size has been reached.

Figure 8A:
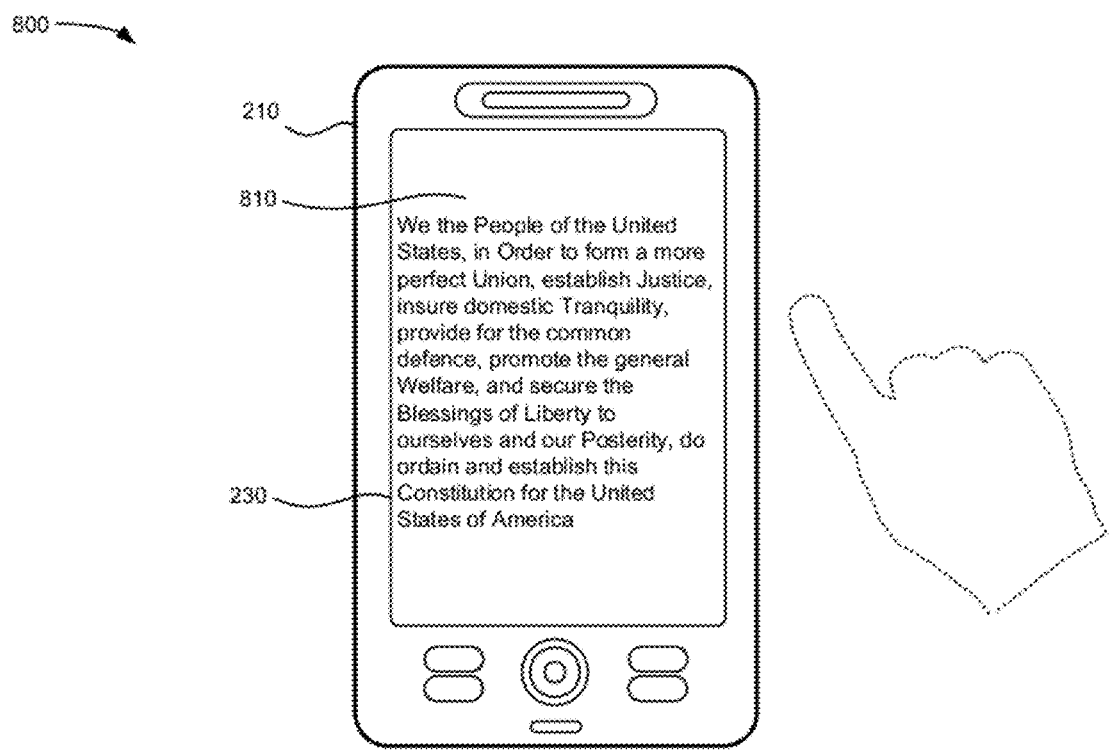
FIGS. 8A through 9F depict examples of the processing described in FIG. 7.
Figure 8B:
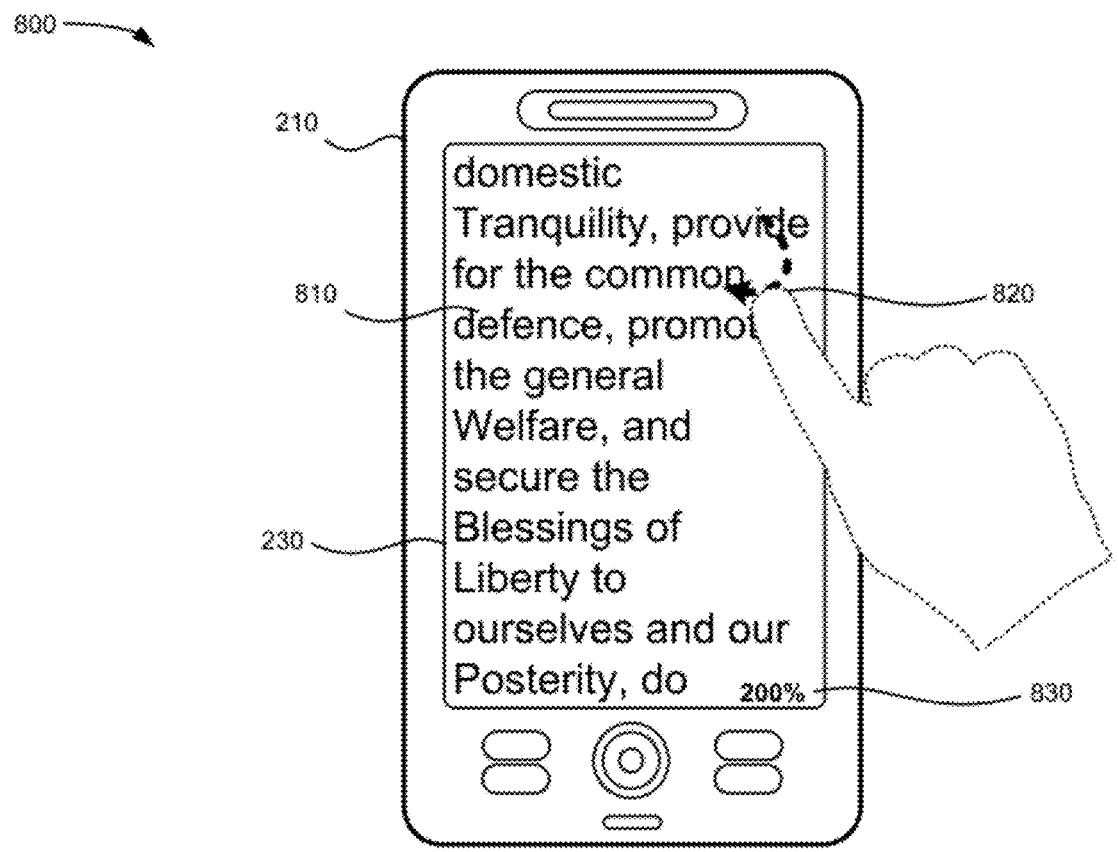
Figure 8C:
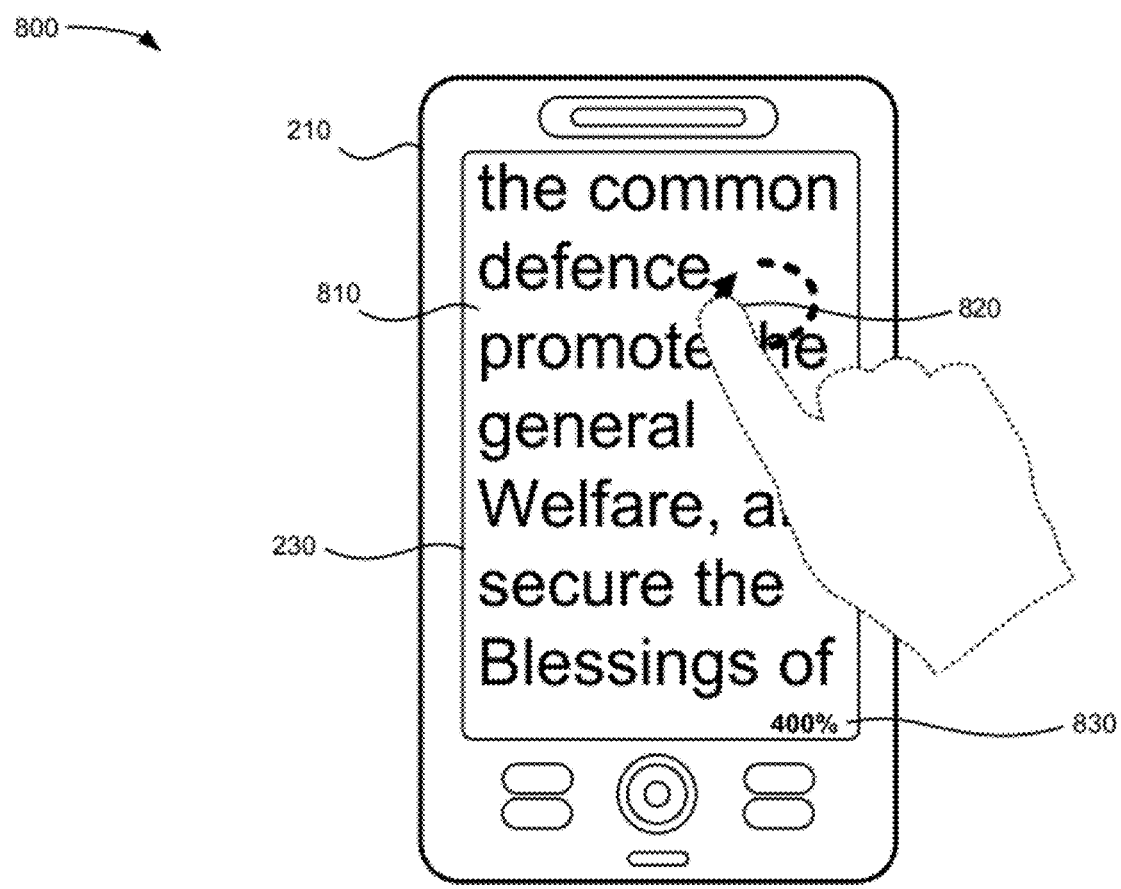

The following examples 800 and 900 of FIGS. 8A-8C and FIGS. 9A-9F, respectively, illustrate the processing described above with respect to FIG. 7. In example 800, assume that a user has stored the sets of parameters illustrated in user interface data component 420 of FIG. 5. Moreover, assume that device 200 is executing a word processing application and that text 810 for the application is currently being displayed on display 230, as illustrated in FIG. 8A. Assume that the user begins making a clockwise circular motion 820 on the surface of display 230. In response, device 200 may zoom in on text 810, as illustrated in FIG. 8B. Since the user has disabled location zooming for the word processing application, device 200 may zoom in on the center portion (or other predetermined portion) of text 810 displayed in display 230. The zooming may occur at a medium speed as the user is making clockwise circular motion 820. As further shown in FIG. 8B, display 230 may provide an indication 830 of a zoom level currently being provided by display 230. As the user continues making clockwise circular motion 820, device 200 may continue zooming in on text 810 until either the user stops making clockwise circular motion 820 or, as illustrated in FIG. 8C, until the maximum zoom size has been reached.

Figure 9A:
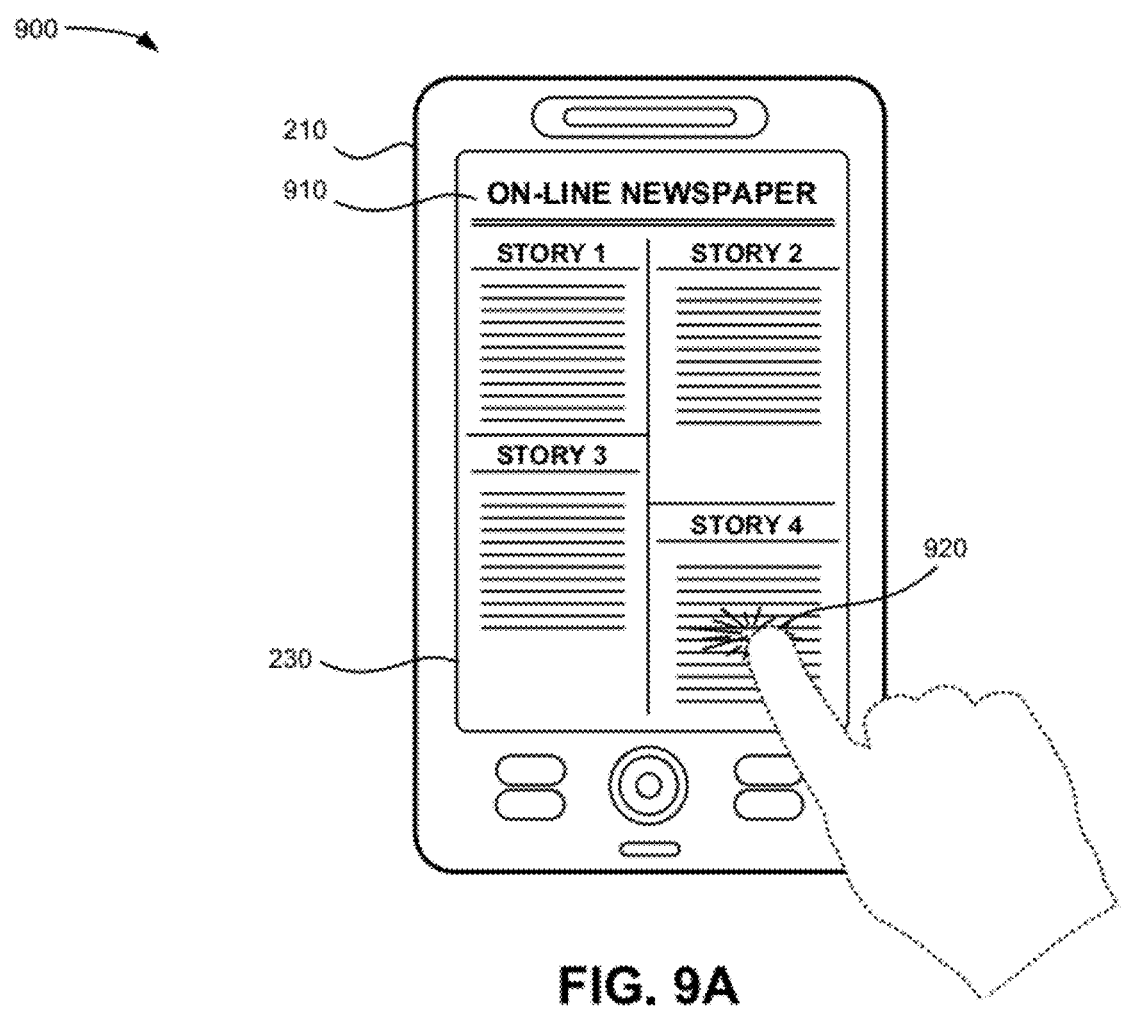
Figure 9B:
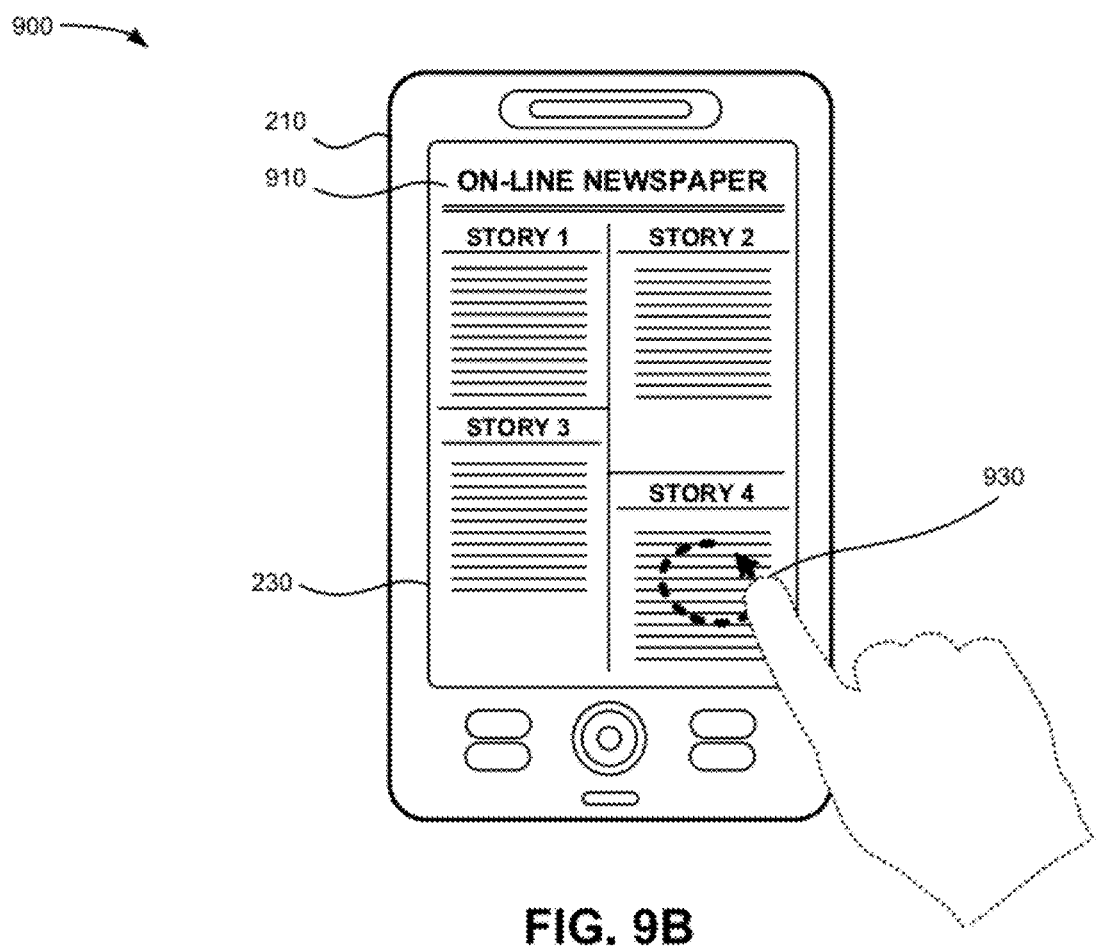
Figure 9C:
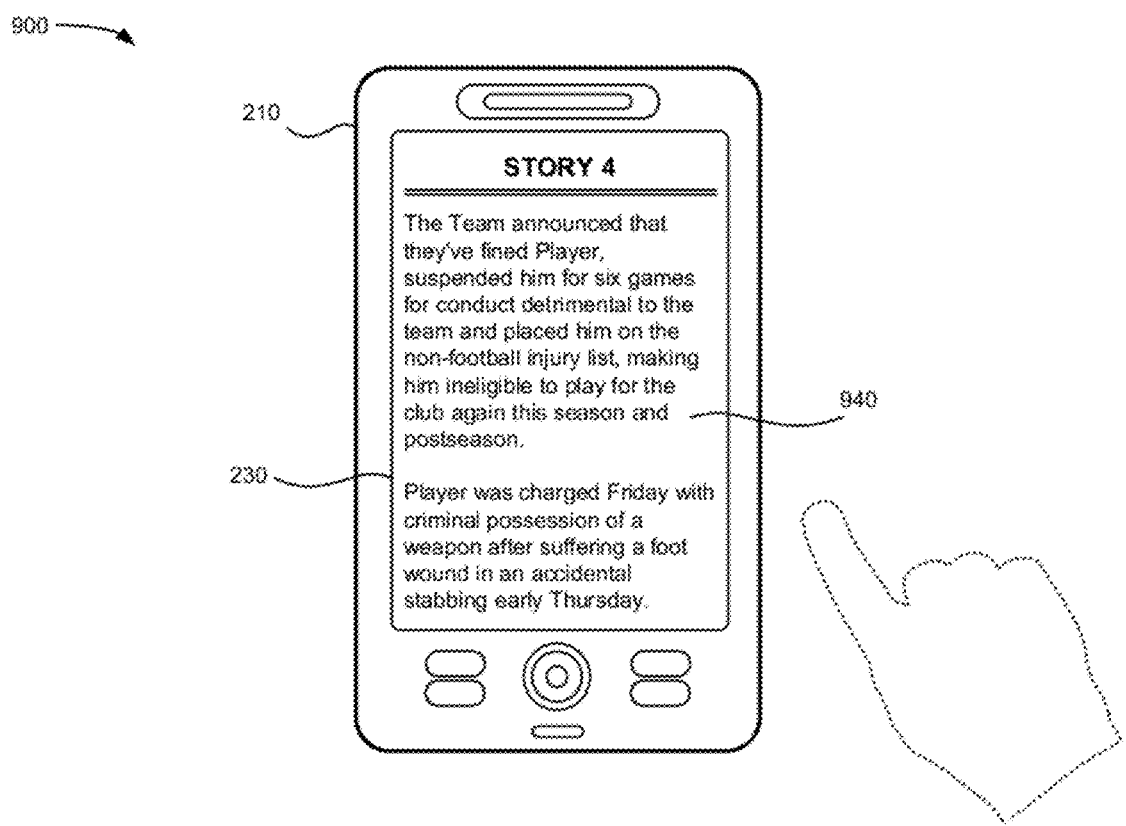

In example 900, assume that a user has stored the sets of parameters illustrated in user interface data component 420 of FIG. 5. Moreover, assume that device 200 is executing a network browser application and that a web page 910 is currently being displayed on display 230, as illustrated in FIG. 9A. Assume that the user touches a surface of display 230 at a location 920. In addition, assume that the user begins making a counter-clockwise circular motion 930 at location 920 on the surface of display 230, as illustrated in FIG. 9B. Since the user enabled location zooming for the network browser application, device 200 may zoom in on web page 910 at the location of counter-clockwise circular motion 930 (i.e., at location 920). As a result, device 200 may provide an enlarged view of "STORY 4" in display 230, as illustrated in FIG. 9C.

Figure 9D:
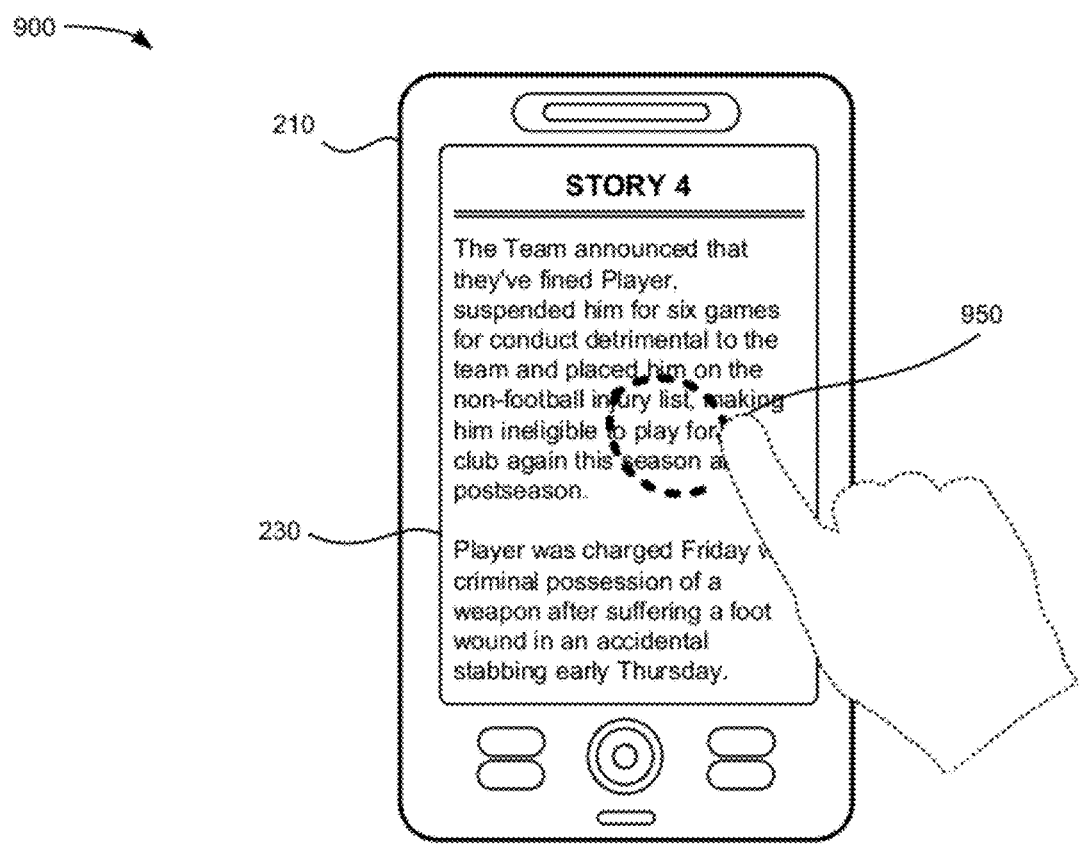
Figure 9E:
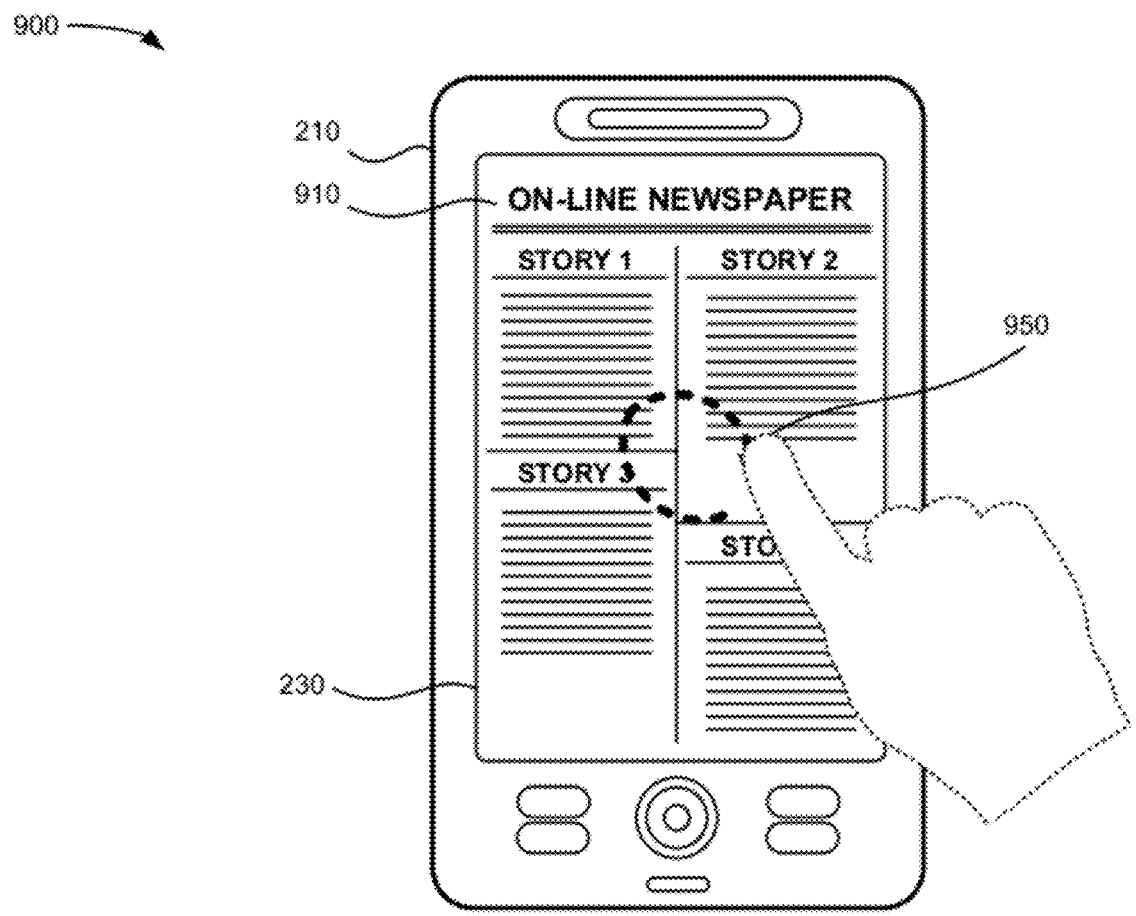
Figure 9F:
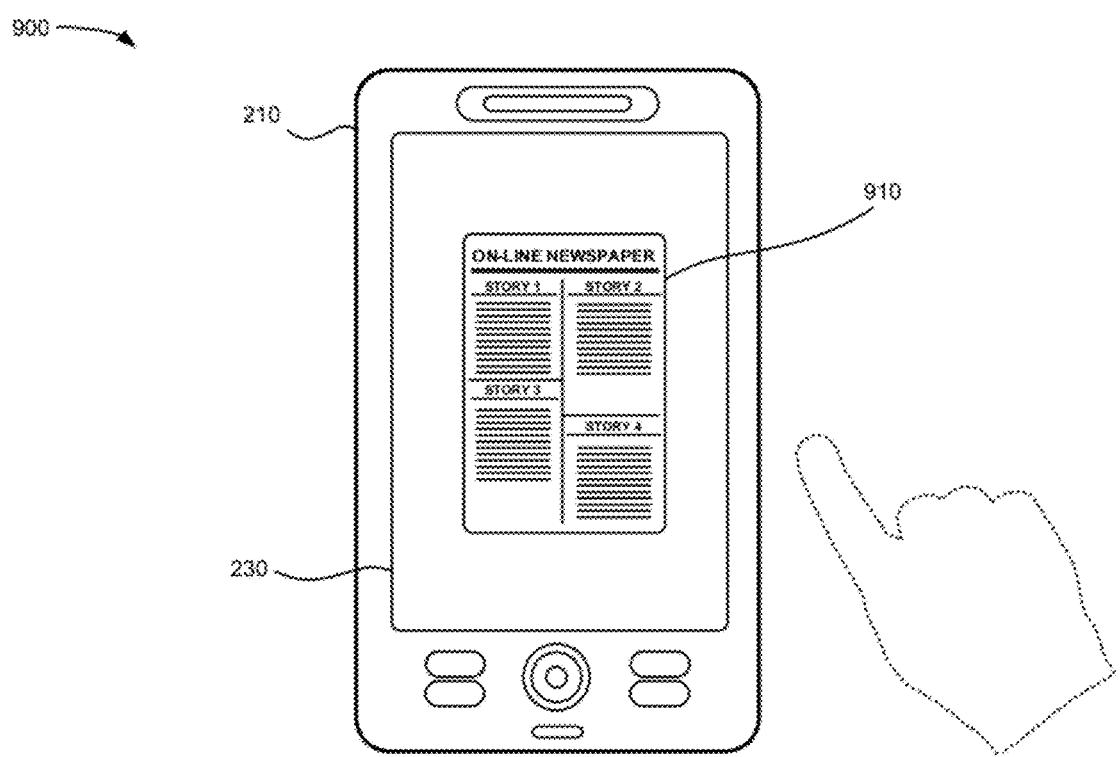

Assume that the user again touches the surface of display 230 and begins, this time, making a clockwise circular motion 950 on the surface of display 230, as illustrated in FIG. 9D. In response, device 200 may zoom out on web page 910 until the originally-sized web page is displayed, as illustrated in FIG. 9E. If the user continues making clockwise circular motion 950, device 200 may continue zooming out on web page 910 until the minimum size (i.e., 10% of the original size) is reached, as illustrated in FIG. 9F, or the user ceases making clockwise circular motion 950.

The foregoing description of implementations provides illustration and description, but is not intended to be exhaustive or to limit the invention to the precise form disclosed. For example, while series of blocks have been described with regard to FIGS. 6 and 7, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    detecting, by a processor, a circular motion being made on or near a surface of a touch screen of a computing device;
    detecting, by the processor and based on the detecting of the circular motion, a location and a size of the circular motion;
    identifying, by the processor and based on the location of the circular motion, an item displayed on the touch screen; and
    zooming in or zooming out, by the processor, on the item, including:
        zooming in or zooming out on the item at a first pace when the size of the circular motion is a particular size,
        zooming in or zooming out at a second pace, that is slower than the first pace, when the size of the circular motion is smaller than the particular size, and
        zooming in or zooming out at a third pace, that is faster than the first pace, when the size of the circular motion is larger than the particular size.

2. The method of claim 1, further comprising:
    identifying an application associated with the item;
    selecting, based on the application, one or more parameters of a plurality of parameters; and
    determining at least one of the first pace, the second pace, the third pace, or the particular size based on the selected one or more parameters.

3. The method of claim 2,
    the one or more parameters including:
        a minimum size parameter that indicates a first size that is a percentage of an original size to which the item can be zoomed out on,
            the original size corresponding to a displayed size of the item prior to the detecting of the circular motion, and
        a maximum size parameter that indicates a second size that is a percentage of the original size to which the item can be zoomed in; and
    the zooming in or zooming out on the item further including:
        zooming out on the item to a size corresponding to or exceeding the first size, or
        zooming in on the item to a size at or below the second size.

4. The method of claim 2,
    the one or more parameters including a speed parameter that indicates how quickly the item is to be zoomed in or zoomed out on, and
    the method further comprising:
        determining at least one of the first pace, the second pace, or the third pace based on the speed parameter.

5. The method of claim 2,
    the one or more parameters including a location zooming parameter that indicates whether zooming is to be performed at a location of the circular motion, and
    the zooming in or zooming out on the item including:
        zooming in or zooming out on the item based on the detected location and the location zooming parameter.

6. The method of claim 1,
    the detecting of the circular motion including:
        detecting a direction associated with the circular motion,
            the direction including a first direction or a second direction that differs from the first direction, and
    the zooming in or zooming out on the item including:
        zooming in on the item when the circular motion is associated with the first direction, or
        zooming out on the item when the circular motion is associated with the second direction.

7. The method of claim 1, further comprising:
    detecting an orientation associated with the computing device when the circular motion is detected,
        the orientation including a first orientation or a second orientation, and
    the zooming in or zooming out on the item including:
        zooming in or zooming out on the item, by a first amount, when the computing device is in the first orientation, and
        zooming in or zooming out on the item, by a second amount that differs from the first amount, when the computing device is in the second orientation.

8. A device comprising:
    a memory to store one or more parameters; and
    a processor to:
        detect a circular motion being made on or near a surface of a touch-sensitive screen,
            the circular motion being associated with a size,
        identify a location on the touch-sensitive screen associated with the circular motion, and
        zoom in or zoom out on an item being displayed on the touch-sensitive screen at the detected location,
            when zooming in or zooming out, the processor is to:
                zoom in or zoom out on the item at a first pace when the size of the circular motion is a particular size,
                zoom in or zoom out at a second pace, that is slower than the first pace, when the size of the circular motion is smaller than the particular size, and
                zoom in or zoom out at a third pace, that is faster than the first pace, when the size of the circular motion is larger than the particular size,
                at least one of the first pace, the second pace, the third pace, and the particular size being based on the one or more parameters.

9. The device of claim 8,
    the memory being further to store a plurality of parameters that include the one or more parameters, and
    the processor being further to:
        identify an application associated with the item, and select the one or more parameters, from the plurality of parameters, based on the application.

10. The device of claim 8,
the one or more parameters including:
a minimum size parameter that indicates a particular size that is a percentage of an original size to which the item can be zoomed out,
the original size corresponding to a displayed size of the item, on the touch-sensitive screen, when the circular motion is detected, and
the processor, when zooming in or zooming out on the item, being further to:
zoom out on the item to a size corresponding to or greater than the minimize particular size.

11. The device of claim 8,
the one or more parameters including:
a maximum size parameter that indicates a particular size that is a percentage of an original size to which the item can be zoomed in on,
the original size corresponding to a displayed size of the item, on the touch-sensitive screen, when the circular motion is detected, and
the processor, when zooming in or zooming out on the item, being further to:
zoom in on the item to a size corresponding to or below the particular size.

12. The device of claim 8, the one or more parameters including:
a speed parameter that indicates how quickly the item is to be zoomed in or zoomed out on, and
the processor being further to:
determine at least one of the first pace, the second pace, or the third pace based on the speed parameter.

13. The device of claim 8,
the processor, when detecting the circular motion, being further to:
detect a direction associated with the circular motion, the direction including a first direction or a second direction that differs from the first direction, and
the processor, when zooming in or zooming out on the item, being further to:
zoom in on the item when the circular motion is associated with the first direction, or
zoom out on the item when the circular motion is associated with the second direction.

14. The device of claim 8,
the processor being further to:
detect an orientation associated with the touch-sensitive screen when the circular motion is detected,
the orientation including a first orientation or a second orientation, and
the processor, when zooming in or zooming out on the item, being further to:
zoom in or zoom out on the item, by a first amount, when the touch-sensitive screen is in the first orientation, and
zoom in or zoom out on the item, by a second amount that differs from the first amount, when the touch-sensitive screen is in the second orientation.

15. A non-transitory computer-readable medium comprising instructions that include:
one or more instructions that, when executed by a processor, cause the processor to detect a circular input associated with a touch screen;
one or more instructions that, when executed by the processor, cause the processor to identify a location on the touch screen and a size associated with the circular input;
one or more instructions that, when executed by the processor, cause the processor to select, based on the identified location, a display item being presented on the touch screen when the circular input is detected; and
one or more instructions that, when executed by the processor, cause the processor to zoom in or zoom out on the display item, including:
one or more instructions to zoom in or zoom out on the display item at a first pace when the size of the circular input is a particular size,
one or more instructions to zoom in or zoom out at a second pace, that is slower than the first pace, when the size of the circular input is smaller than the particular size, and
one or more instructions to zoom in or zoom out at a third pace, that is faster than the first pace, when the size of the circular input is larger than the particular size.

16. The non-transitory computer-readable medium of claim 15, the instructions further including,
one or more instructions to identify an application associated with the display item,
one or more instructions to select one or more parameters, from a plurality of parameters, based on the identified application; and
one or more instructions to determine the first pace, the second pace, and the third pace based on the one or more parameters.

17. The non-transitory computer-readable medium of claim 15, the one or more instructions to zoom in or zoom out on the display item further including:
one or more instructions to zoom out on the display item to a size corresponding to or greater than a minimum size parameter that indicates a particular size that is a percentage of an original size to which the display item can be zoomed out on,
the original size corresponding to a displayed size of the display item, on the touch-sensitive screen, when the circular input is detected.

18. The non-transitory computer-readable medium of claim 15, the one or more instructions to zoom in or zoom out on the display item further including:
one or more instructions to zoom in on the display item to a size corresponding to or below a maximum size parameter that indicates a particular size that is a percentage of an original size to which the display item can be zoomed in on,
the original size corresponding to a displayed size of the display item, on the touch-sensitive screen, when the circular input is detected.

19. The non-transitory computer-readable medium of claim 15,
the one or more instructions to detect the circular input further including:
one or more instructions to detect a direction associated with the circular input, the direction including a first direction or a second direction that differs from the first direction, and
the one or more instructions to zoom in or zoom out on the display item further including:
one or more instructions to zoom in on the display item when the circular input is associated with the first direction, or one or more instructions to zoom out on the display item when the circular input is associated with the second direction.

20. The non-transitory computer-readable medium of claim 15, the instructions further including:

one or more instructions to detect an orientation associated with the touch screen when the circular input is detected, the orientation including a first orientation or a second orientation, and the one or more instructions to zoom in or zoom out on the display item further including:

one or more instructions to zoom in or zoom out on the display item, by a first amount, when the touch screen is in the first orientation, and one or more instructions to zoom in or zoom out on the display item, by a second amount that differs from the first amount, when the touch screen is in the second orientation.

* * * * *